3,333,107
OPTICAL ANALYZING APPARATUS HAVING RECTILINEAR LIGHT SOURCE AND FLATTENED-ELLIPSE SHAPED FLUID CELL
Richard W. Hubbard, Mountain View, and Dorothy Kremen, Palo Alto, Calif., assignors to Beckman Instruments, Inc., a corporation of California
Filed Apr. 9, 1964, Ser. No. 358,487
2 Claims. (Cl. 250—218)

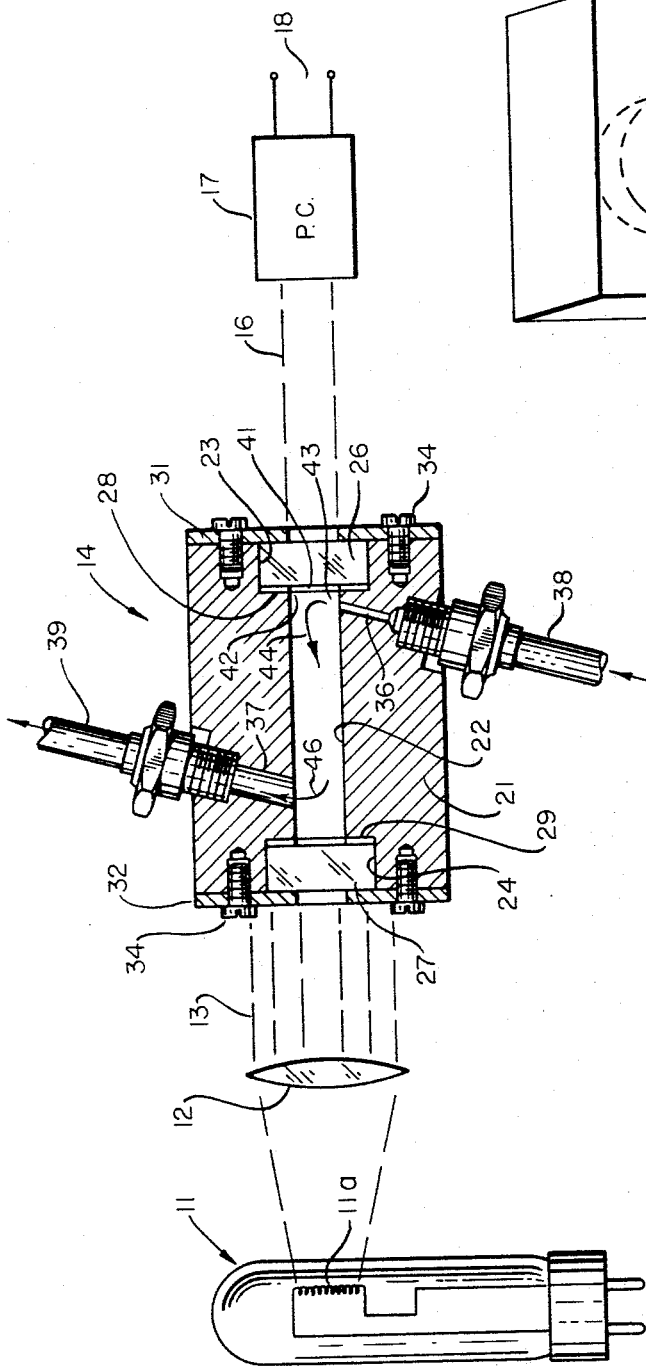
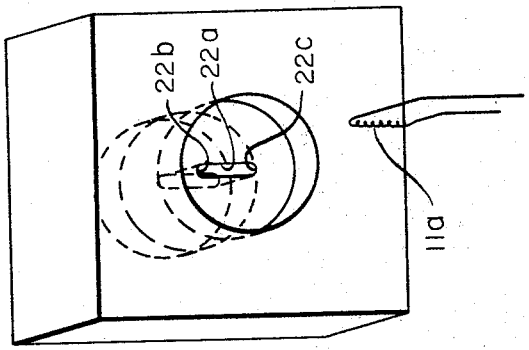
FIG. 1
FIG. 2
INVENTORS
DOROTHY KREMEN
RICHARD W. HUBBARD
BY
Flehr and Swain
ATTORNEYS

This invention relates generally to an optical analyzing apparatus and fluid cell therefor, and more particularly to an optical analyzing apparatus and fluid cell which presents a relatively long fluid path for analysis.

Prior art fluid cells have been constructed so that they offer a smooth channel wherein the fluid does not undergo any mixing. In general, the cells of the prior art consist of any elongated tube or channel having an inlet at one end and an outlet at the other end with the inlet and outlet being of substantially the same diameter whereby to minimize any possible turbulence. A light beam is projected through the cell at right angles with respect to the fluid flow.

Other prior art fluid cells include a fluid channel arranged with its axis parallel to the light beam so as to provide a relatively long fluid path. Such a cell is described in copending patent application Ser. No. 321,204 filed Nov. 4, 1963, entitled "Optical Analyzing Apparatus and Fluid Cell Therefor," now Patent No. 3,307,447 which is assigned to the assignee of the present application.

In general it is an object of the present invention to provide an improved optical analyzing apparatus and fluid cell therefor.

In utilizing optical analyzing devices of the kind described herein there has been an increasing need to supply a more sensitive device capable of analyzing ever smaller volumes of material, without sacrificing reliable results. Devices of the prior art were previously subject to stray light error, which could, however, be tolerated when using larger amounts of sample. This would hold, for example, when this kind of device is used for amino acid analysis in an amino acid analyzer for sample sizes greater than .04 of a micromole of each ninhydrin reacted amino acid.

According to the present invention, a cuvette design is provided which allows lower volumes of sample (e.g., on the order of .003 micromole of an amino acid) to be measured accurately without stray light error. Furthermore, for enhanced ability to measure ever smaller amounts of sample, the light path of this design can be increased without the necessity of increasing the light source intensity. Previous designs have required an increased in light source intensity as the light path length is increased. Increases in light source intensity, however, introduce problems in heat dissipation, high lamp cost, shortened lamp life and the like.

We have observed that the foregoing and other problems are avoided by making the analyzing chamber with closely spaced, substantially parallel sides to form a slit-like light passage while employing a light beam from a rectilinear source. It has been further observed that with this arrangement, significantly lower micromole and nanomole levels of sample can be analyzed with considerably improved precision. Light efficiency is considerably improved and stray light error reduced to a minimum.

Thus, it is a further object of the present invention to provide a fluid cell optical analyzing apparatus wherein ever smaller amounts of sample can be analyzed with greater sensitivity then heretofore.

These and other objects of the invention will become more clearly apparent from the following detailed description of a preferred embodiment, when taken in conjunction with the drawings, in which:

FIGURE 1 is a side elevation cross-section of apparatus according to the invention; and FIGURE 2 is a schematic perspective view of the fluid cell according to the invention.

Referring to the drawings, there is schematically illustrated in light source 11 of a type employing a rectilinear lighting filament 11a. The light radiated from source 11 is focused by lens 12 schematically represented so as to provide a light beam 13. Beam 13 impinges upon fluid in cell 14, to be presently described in detail. The light travelling through cell 14 and fluid within the cell emerges at 16 and impinges upon a transducer 17 which may, for example, be a photocell or other photoresponsive device which provides an electrical output signal at the terminals 18. The output signal is, therefore, indicative of the intensity of light impinging thereon.

Cell 14 includes a body 21 which may be made of any suitable material, such as non-corrosive metal or plastic. Preferably, the body is made of polyvinyl plastic. The cell body is formed to include an opening 22 having a transverse cross-section formed as a "flattened ellipse." The latter term, as used herein, refers to that shape having substantially parallel, spaced sides joined at each end by an annular curve such as a portion of a circle or ellipse. Thus, the opening 22 includes closely spaced, substantially parallel side walls 22a as shown in FIGURE 2 and annular top and bottom surfaces 22b, 22c, respectively. The ends of the body 21 are formed to provide circular recesses 23 and 24, respectively, which accommodate windows 26 and 27. A pair of gaskets 28 and 29 have openings which coincide with channel 22. They are placed at each end of channel 22 between the corresponding window and body portions. Retainers 31 and 32 are secured to the ends of the body as, for example, with screws 34. By tightening screws 34, the windows are urged against the gaskets to provide a seal.

The chamber defined by the inside surfaces of the spaced windows 26 and 27 and the walls of channel 22 comprises the analyzing chamber through which the fluid to be analyzed is passed.

Channel 22 is provided with an inlet 36 and outlet 37. Fittings 38 and 39 are provided for connecting the inlet and outlet to associated equipment.

Inlet opening 36 has a considerably smaller diameter than the outlet opening 37, whereby for a given flow of fluid through channel 22, the fluid has a much higher velocity at the inlet than at the outlet. A fluid jet is thereby provided at the inlet. This fluid jet serves to eliminate any standing fluid in chamber 22 and assures good mixing.

The top and bottom surfaces 22b, 22c respectively serve to prevent any fluid from hanging up within chamber 22 and permit fluid sample therein to "clear" chamber 22 completely.

Subsequent to fluid entering chamber 22 via jet 36, it flows slowly axially through the cuvette as indicated generally by the arrows 44 and 46, and then outwardly via the opening 37. Opening 37 is of substantially larger diameter whereby the fluid flows without turbulence from the chamber.

Thus, the inlet opening is so directed towards the rear and against the windows as to flush out what would otherwise be dead corners and to give efficient mixing. The inlet diameter is extremely small so that the jet action provides the necessary mixing within the confined cuvette chamber. The outlet, on the other hand, is relatively large compared to the inlet and prevents formation of possible dead spaces for the entrapment of fluid adjacent the same. The uphill flow from the lower inlet opening to the higher outlet opening prevents the entrapment of bubbles.

Filament 11a lies in the extension of a plane passing between, and parallel to side walls 22a of cell 22. Thus, filament 11a provides a light beam of maximum efficiency directed along the cell between the side walls. The cell 22, as noted, includes throughout its length a transverse cross-section of a "flattened ellipse" shape with substantially spaced parallel sides and rounded ends. This construction serves to make highly efficient use of the light generated by filament 11a so as to avoid the necessity of increasing the light intensity of the source. It has been observed that an approximate three to five fold increase in sensitivity is achieved in this manner so as to permit ever lower volumes of sample to be measured with reliable accuracy. The elongated, slit-like construction of channel 22 serves to limit stray light and confine the light beam to the sample being examined. Diffusion patterns are restricted. As inferred above, apparatus according to the above construction is particularly useful in amino acid analysis procedures.

We claim:

1. In optical analyzing apparatus having means forming a light beam, photoresponsive means for receiving light and providing an electrical signal representative of the received light, and a fluid receiving cell having an elongated channel arranged with its longitudinal axis parallel to the light wherein the light beam travels along the axis of the channel and fluid therein, the combination wherein said channel has a uniform cross-section throughout the length thereof and is formed with closely spaced, substantially parallel sidewalls, and said first named means includes a generally rectilinear source of light, said light source including a rectilinear filament, said filament lying in the extension of a plane passing between and generally parallel to said side walls of the channel.

2. In an optical analyzing apparatus having means forming a light beam, transducing means for receiving light and providing an electrical signal representative of the received light, a fluid cell disposed in the light beam whereby the light travels through the cell and fluid therein, the cell having an elongated channel arranged with its longitudinal axis parallel to the light whereby the light beam travels along the axis of the channel and is received by the transducing means and wherein the cell is provided with a fluid inlet and outlet opening at ends of the channel for directing fluids through the channel wherein said channel has a uniform transverse cross-section of a "flattened ellipse" shape throughout the length thereof including substantially parallel, spaced side walls, and said light source is rectilinear and disposed in the extension of a plane passing between and parallel to said side walls of the channel.

References Cited
UNITED STATES PATENTS

| | | | |
|---|---|---|---|
| 2,295,366 | 9/1942 | Stout | 250—218 |
| 3,053,138 | 9/1962 | Sany | 88—14 |
| 3,205,764 | 9/1965 | Letter | 88—14 |

RALPH G. NILSON, *Primary Examiner.*

WALTER L. STOLWEIN, *Examiner.*

M. ABRAMSON, *Assistant Examiner.*